United States Patent Office 3,461,143
Patented Aug. 12, 1969

3,461,143
PRODUCTION OF SULFAGUANIDINE
Pandurang Krishnacharya Nargund, Bulsar, India, assignor to American Cyanamid Company, Stamford, Conn., a corporation of Maine
No Drawing. Continuation-in-part of application Ser. No. 555,269, June 6, 1966. This application June 27, 1968, Ser. No. 740,455
Int. Cl. C07c 143/80
U.S. Cl. 260—397.7      8 Claims

ABSTRACT OF THE DISCLOSURE

Pharmaceutical grade sulfaguanidine as its hydrate is produced by reacting sodium or potassium cyanamide with p-acetylsulfanilyl chloride in water at pH 8 to 11; isolating and drying the sodium or potassium sulfanilyl cyanamide, then reacting with an ammonium salt, in the presence of anhydrous ammonia and a lower alkanol, at 120° C. to 250° C.; then distilling off the alkanol, and recrystallizing the product from water. Sulfaguanidine is a therapeutic agent, and may also be used as an intermediate for the production of other therapeutic agents, such as sulfamethazine.

CROSS REFERENCE TO RELATED APPLICATION

This application is a continuation-in-part of my copending application Ser. No. 555,269, filed June 6, 1966, to be abandoned in favor of the present application.

SUMMARY OF THE INVENTION

This invention relates to the synthesis of sulfaguanidine, in pharmaceutically acceptable form, by the reaction of sodium or potassium sulfanilyl cyanamide with an ammonium salt in the presence of alcoholic anhydrous ammonia. The sodium or potassium sulfanilyl cyanamide may be produced from acetylsulfanilyl chloride and cyanamide in the presence of aqueous alkali, such as sodium hydroxide or potassium hydroxide.

The reactions for the sodium compounds may be written:

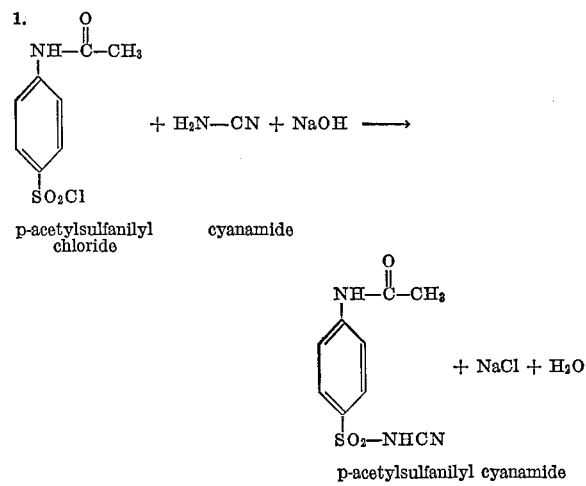

p-acetylsulfanilyl cyanamide

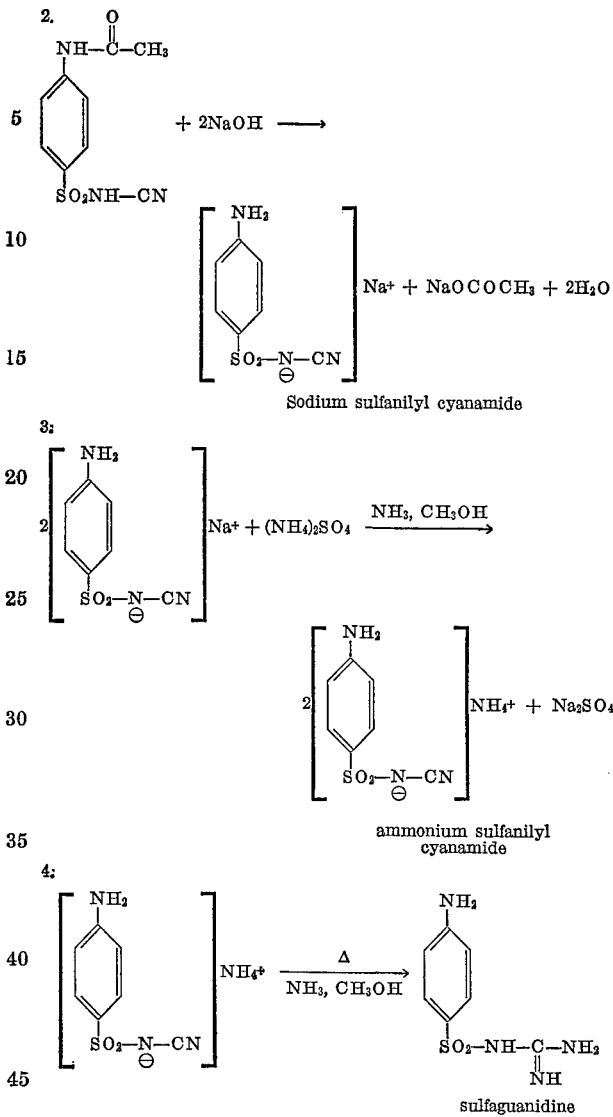

Sulfaguanidine is an important chemotherapeutic agent useful in the treatment of various intestinal infections. It is particularly valuable for such use in that it is not readily absorbed from the gastrointestinal tract, thus minimizing toxicity. It is also useful as an intermediate for additional chemotherapeutic agents.

Sulfaguanidine in the past has been prepared by several methods, including that described in U.S. Patent 2,380,006, P. S. Winnek and H. E. Faith, "Method of Preparing Sulphanilyl Guanidine," July 10, 1945. There is described the fusion of calcium acetylsulfanilyl cyanamide with ammonium nitrate. Polish Patent 42,083, referred to in Chemical Abstracts, 55, 5426e, 1961, discloses reaction of p-acetylsulfanilyl chloride and calcium cyanamide, and later conversion by methanolic ammonia, in the presence of small amounts of ammonium or calcium chloride, to produce sulfaguanidine.

It has now been found that sulfaguanidine can be prepared in better yield and better purity by reaction of acetylsulfanilyl chloride with cyanamide in aqueous alkali (which also hydrolyzes the acetyl group) forming sodium or potassium sulfanilyl cyanamide which is then reacted with 1 to 2 equivalents of an ammonium salt of an acid in the presence of 1 to 2 moles of anhydrous ammonia in alcohol to form the desired product. A surprisingly high yield and purity of sulfaguanidine is obtained.

According to the present invention acetylsulfanilyl chloride is reacted with cyanamide in water maintained at pH 8.0–11.0, preferably about pH 8.5 to 9.5, with sodium or potassium hydroxide; then additional sodium or potassium hydroxide is added to remove the acetyl group by hydrolysis and ensure that the sulfanilyl cyanamide thus formed is the sodium or potassium salt. The salt is isolated, dried, and then reacted with an ammonium salt in the presence of anhydrous ammonia ($NH_3$) in alcohol. The desired product, sulfaguanidine, is recovered from the reaction mixture in yields in excess of 80% based on the acetylsulfanilyl chloride employed, and a purity of 99% as the hydrate.

The ratio of acetylsulfanilyl chloride to cyanamide is generally equimolar. While some deviation from this ratio is possible, no particular benefits occur. Such deviations are wasteful of raw materials and may lead to added impurities. The additional alkali is added to produce a solution containing between 5 and 15%, preferably between 7.5 and 12.5%, of the alkali based on the total volume of water present.

During the reaction of acetylsulfanilyl chloride with cyanamide, the temperature should be in the range 0° to 50° C., preferably 20° to 35° C. Cooling may be necessary. A time of about three hours at the preferred temperature range is preferred.

For hydrolysis and salt formation, the temperature is raised, preferably to about 90° C. for about an hour.

The desired product, sodium or potassium sulfanilyl cyanamide, is precipitated out of solution by a combination of cooling and salt addition. While not critical, it is convenient and inexpensive to use sodium chloride. The salt is added to the hot solution, and the mixture cooled. Precipitation of the product begins at about 75° C. and crystallization is essentially complete when the temperature reaches about 20° C. It is preferable to effect cooling slowly so as to obtain the product in desirable form. The sodium or potassium sulfanilyl cyanamide is then isolated by suitable means such as by filtration, at a yield of about 95% or more, containing some sodium chloride, which is removed in subsequent steps.

The alkali sulfanilyl cyanamide is then reacted with an ammonium salt of an acid in the presence of anhydrous ammonia in alcohol, preferably methanol. Some excess anhydrous ammonia should be present in the reaction mixture. The amount of anhydrous ammonia may vary from about 1 to 2 moles per mole of sodium sulfanilyl cyanamide. The amount of ammonium salt present should be about 1 to 2 equivalents per mole of sodium sulfanilyl cyanamide.

The ammonium salt is preferably ammonium sulfate. The anion reacts with the alkali metal, acting as an alkali metal scavenger, and furnishing additional ammonia, a strong acid serves as a more efficient scavenger. Ammonium sulfate is low in cost. Ammonium chloride gives good results, but has a minor disadvantage in that the chloride ion may attack the metal parts of the system. Glass lines reactors permit the successful use of ammonium chloride. Other salts such as ammonium bromide or ammonium acetate are more costly, but otherwise satisfactory. Strong oxidizing acid salts such as ammonium nitrate, or perchlorate give good results; ammonium sulfate is preferred over these as being more inert and less subject to the possible side reactions.

Other lower alcohols such as ethanol, propanol, isopropanol, etc. may be used, but methanol is most economical. Similarly, potassium salts may be used, but sodium salts and sodium hydroxide throughout is more economical. After the reaction, the alcoholic solution may be decanted from any residual salt, the alcohol distilled from the mixture, the product recrystallized from water, and high grade sulfaguanidine is obtained as the hydrate, the usual form of the drug. More than one recrystallization may be used.

The reaction between the alkali sulfanilyl cyanamide and the ammonium salt in the presence of alcoholic anhydrous ammonia is conveniently carried out at an elevated temperature under pressure. The temperature and pressure at which the reaction may be run may vary widely. The specific reaction pressure depends to some extent upon the particular reaction temperature employed.

The pressure is autogenous. In the laboratory, or on a small scale, liquid ammonia gives excellent results. Because of the low boiling point of anhydrous ammonia (−35.5° C.) the system must be cool, or evaporation of ammonia cools the system. The system is closed before heating. The terms liquid ammonia and anhydrous ammonia are at times used interchangeably (see Hackh's Chemical Dictionary, Blakiston Co., Philadelphia, 3rd edition, 1944, page 46). On a larger scale, and for manufacturing in bulk, a closed container is preferred, into which anhydrous ammonia is charged. A closed system is preferred, both to avoid the cost of loss of ammonia, and because the ammonia has an extremely strong odor. The closed system is preferably an autoclave which can stand the high pressure generated when the system is heated. The pressure may be below that of anhydrous ammonia itself, as the alcohol acts as a solvent, in part dissolving the ammonia. Air may be vented from the system during charging, but the partial pressure of air is minor, and can be ignored. The pressure in part depends upon the vapor space in the reactor.

The reaction pressure may vary up to several thousand pounds per square inch. It is preferred to run the reaction at about 100–500 pounds per square inch. The temperature of the reaction may be from about 120° C. to 250° C. or higher but it is preferred to carry out the reaction at about 150° C. The time of reaction varies with the temperature. A time of about 5 hours is sufficient when the pressure is about 200 lbs./in.$^2$ and the temperature is 150° C.

By the preferred process, yields of 80% or more are obtained. By the fusion of the Winnek et al. patent, yields are about 60 to 65%, and using the process described in the Polish patent, supra, about 66% is obtained.

The invention is illustrated in the following examples in which all parts are by weight, and temperatures in centigrade, unless otherwise specified:

Example 1.—Sodium sulfanilyl cyanamide

To a solution of 98 parts (2.33 moles) of cyanamide in 966 parts of water is added 525 parts of acetylsulfanilyl chloride (2.26 moles) over a period of two hours while maintaining the pH of the reaction mixture at 9.0 to 9.5 by the addition of 231 parts of 50% sodium hydroxide solution in increments. The reaction mixture is maintained at 25–30° C. by external cooling. After addition is complete, the reaction mixture is stirred for an additional hour while the pH is maintained at 9.0 to 9.5. Cooling is not necessary. An additional 240 parts of 50% sodium hydroxide is then added, the reaction mixture heated to 90° C. and held at this temperature for one hour with agitation. 240 parts of sodium chloride is added, then the reaction mixture is allowed to cool slowly. At 70–75° C. precipitation of sodium sulfanilyl cyanamide begins and crystallization proceeds as the temperature is gradually lowered to 20° C. The product is isolated by filtration, washed with 35% brine solution, and dried at 60–80° C. In a typical run, 554.4 parts of a product was obtained containing 84.18% sodium sulfanilyl cyanamide, 16.51% sodium chloride and 0.21% water. The yield was 95.5% of theory.

Example 2.—Preparation of sulfaguanidine

A mixture of 78.9 parts of sodium sulfanilyl cyanamide (0.36 mole), 48 parts (0.36 mole, 0.72 equivalent) of ammonium sulfate, 9.6 parts (0.56 mole) of anhydrous ammonia, and 200 parts of methanol was heated in an autoclave at 150° C. for 5 hours, the autogenous pressure being about 200 lbs./in.$^2$. After cooling the reaction mixture was then decanted to a distillation flask and solvent removed. The residue was recrystallized from 900 parts water. The product was separated by filtration, washed with cold water, and dried. There was obtained 72.3 parts, representing a yield of 85.5%. The product had a purity of 99.0% as sulfaguanidine hydrate and melted at 188.6–190.2° C.

Example 3

A similar preparation run as in Example 2 but omitting the ammonium sulfate was unsuccessful, 89% of sulfanilyl cyanamide was isolated, unreacted.

Example 4

The procedure of Example 2 was repeated except that 36.0 parts (0.27 mole, 0.54 equivalent) of ammonium sulfate were employed instead of the 48 parts of this salt in Example 2. The yield was 69.5 parts, representing a yield of 81.5%, and having a melting point of 188–189.6° C. The product had a purity of 99.0% as sulfaguanidine hydrate.

Example 5

A mixture of 106 parts of sodium sulfanilyl cyanamide, 53.4 parts of ammonium bromide, 10 parts of anhydrous ammonia and 158 parts of methanol was heated in an autoclave at 150° C. for five hours, under autogenous pressure. The mixture was cooled, and the solvent removed by distillation. The sulfaguanidine obtained was recrystallized from 900 parts of water, separating by filtration, washing with cold water and then drying the product. The yield was 79.4% of theoretical with a purity of 98.7% as sulfaguanidine hydrate.

Example 6

A mixture of 79.6 parts of sodium sulfanilyl cyanamide, 29.4 parts of ammonium chloride, 5 parts of anhydrous ammonia and 158 parts of methanol was heated in an autoclave at 150° C. for five hours, under autogenous pressure. The mixture was cooled, and the solvent removed by distillation. The sulfaguanidine obtained was recrystallized from 900 parts of water, separating by filtration, washing with cold water and then drying the product. The yield was 80.0% of theoretical with a purity of 97.5 as sulfaguanidine hydrate.

I claim:

1. The process for producing pharmaceutical grade sulfaguanidine as the hydrate which comprises mixing and reacting in the presence of water, at a temperature between about 0° C. and 50° C., about equivalent quantities of acetylsulfanilyl chloride and cyanamide at a pH of about 8.0 to 11.0 in the presence of sodium or potassium hydroxide, then adding about 5% to 15%, based upon the water present, of sodium or potassium hydroxide, and heating to hydrolyze the acetyl group, isolating by salting out and cooling, and then drying the sodium or potassium sulfanilyl cyanamide produced, and per mole thereof, mixing with about 1 to 2 equivalents of an ammonium salt and about 1 to 2 moles of anhydrous ammonia in a lower alkanol, heating under autogenous pressure between about 120° C. and about 250° C., cooling, then distilling off the alkanol and recrystallizing the thus produced sulfaguanidine from water.

2. The process of claim 1 in which the pH is between 8.5 and 9.5, using sodium hydroxide as the alkali.

3. The process of claim 2 in which the ammonium salt is ammonium sulfate.

4. The process of claim 3 in which the lower alkanol is methanol.

5. The process for producing pharmaceutical grade sulfaguanidine as the hydrate which comprises reacting the sodium or potassium salt of sulfanilyl cyanamide with an ammonium salt in the presence of anhydrous ammonia and a lower alkanol by heating under autogenous pressure between about 120° C. and about 250° C., then after the reaction, cooling, distilling off the alkanol and recrystallizing the thus produced sulfaguanidine from water; the ratio of reactants being between about 1 and 2 moles of liquid ammonia and about 1 and 2 equivalent of the ammonium salt per mole of said sulfanilyl cyanamide salt.

6. The process of claim 5 in which the alkali metal salt of sulfanilyl cyanamide is the sodium salt.

7. The process of claim 5 in which the ammonium salt is ammonium sulfate.

8. The process of claim 7 in which the lower alcohol is methanol.

References Cited

UNITED STATES PATENTS 2,377,485    5/1945    Faith _____ 260—397.7

HENRY R. JILES, Primary Examiner

HARRY I. MOATZ, Assistant Examiner

U.S. Cl. X.R.

260—543

UNITED STATES PATENT OFFICE
CERTIFICATE OF CORRECTION

Patent No. 3,461,143                                                August 12, 196

Pandurang Krishnacharya Nargund

It is certified that error appears in the above identified patent and that said Letters Patent are hereby corrected as shown below:

Column 3, line 72, "pos-" should read -- possibility of a uncontrollable exotherm or explosion. --.

Signed and sealed this 10th day of February 1970.

(SEAL)
Attest:

Edward M. Fletcher, Jr.                              WILLIAM E. SCHUYLER, JI
Attesting Officer                                               Commissioner of Patent